United States Patent [19]

Schonberger

[11] 4,434,416
[45] Feb. 28, 1984

[54] THERMISTORS, AND A METHOD OF THEIR FABRICATION

[76] Inventor: Milton Schonberger, 1 Century Tower, Ft. Lee, N.J. 07024

[21] Appl. No.: 506,805

[22] Filed: Jun. 22, 1983

[51] Int. Cl.$^3$ ............... H01C 1/142; H01C 7/18; H01C 17/24
[52] U.S. Cl. .................. 338/22 R; 29/612; 29/414; 29/583; 51/319; 219/121 LG; 225/2; 338/22 SD; 338/195; 338/203; 338/326
[58] Field of Search ........ 338/203, 25, 22 R, 225 SD, 338/307, 308, 309, 195, 326, 327; 29/612, 610, 413, 414, 583; 225/2; 219/121 LG, 121 LH, 121 LJ; 51/310, 319

[56] References Cited

U.S. PATENT DOCUMENTS 3,392,440  7/1968  Yanagawa ........................ 225/2
4,232,059  11/1980  Proffitt ............................. 51/319
4,355,457  10/1982  Burlett et al. ..................... 29/414

Primary Examiner—Bruce A. Reynolds
Assistant Examiner—C. N. Sears
Attorney, Agent, or Firm—Ostrolenk, Faber, Gerb & Soffen

[57] ABSTRACT

A rectangular wafer thermistor comprises a piece of ceramic thermistor material having electric contact material covering its opposite surfaces. A contact defining score mark with an open geometric shape other than a straight line extends across the thermistor through one layer of the contact material for separating the contact material on that surface into two contacts. The ends of the contact defining score mark intersect the opposite edges of the thermistor at different locations along the thermistor. The contact defining score marks may be V or U or otherwise shaped, and the intersections between the different sections of these score marks are preferably rounded, but may be sharp corners. The shape of the contact defining score mark prevents the thermistor from breaking at the contact defining score mark when the thermistor is broken off a large sheet of thermistor material. A sheet of ceramic thermistor material, coated on its opposite surfaces with contact material, has a grid of thermistor defining score marks defined in one surface, and the sections of the sheet surrounded by the grid lines form individual thermistors. A bending moment of force applied to the sheet will break the sheet along the thermistor defining score marks, but the geometric shape of the contact defining score mark in each thermistor will prevent the thermistor from breaking on the contact defining score mark.

29 Claims, 9 Drawing Figures

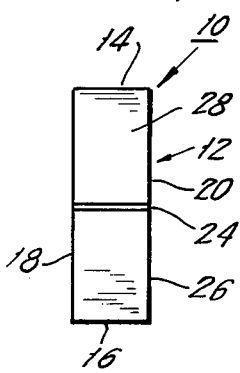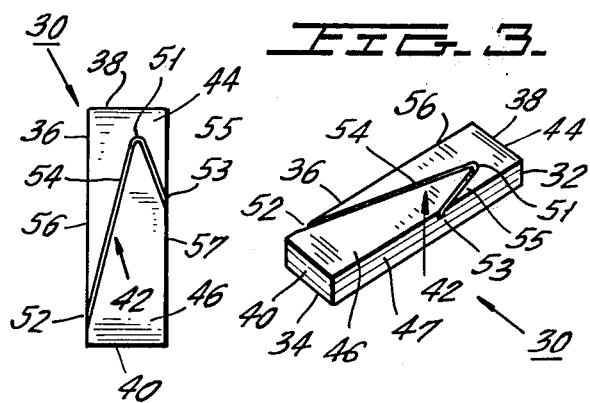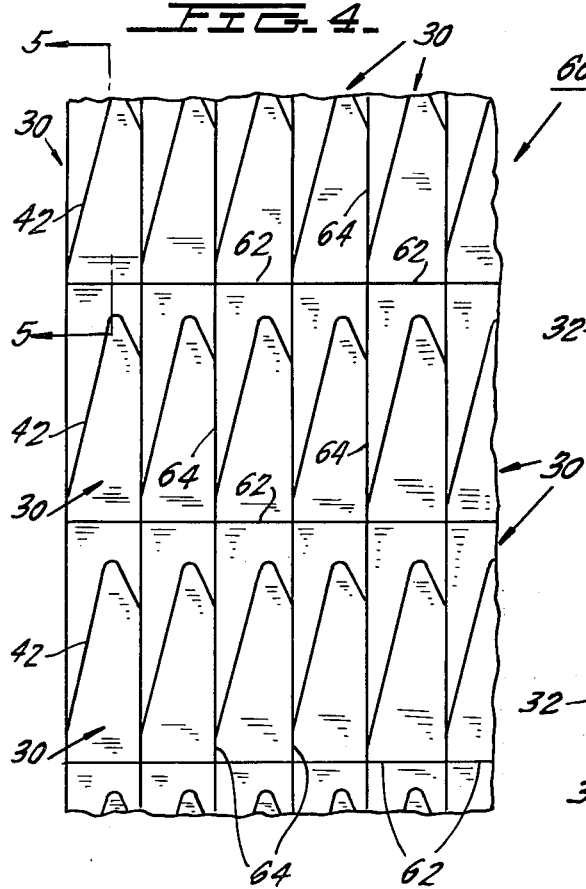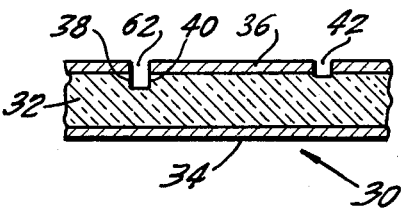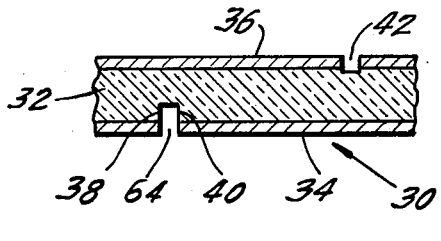

THERMISTORS, AND A METHOD OF THEIR FABRICATION

BACKGROUND OF THE INVENTION

The present invention relates to the fabrication of thermistors, or the like electrical components. The thermistors being fabricated are quite thin, i.e. wafers. A thermistor has a pair of electric contacts defined on one side of its body and the contacts are separated by a gap. Wafer thermistors can be initially fabricated in a large, flat sheet from which the thermistors are thereafter separated.

Small size, wafer-shaped thermistors are beneficial for obtaining a rapid, accurate response in a clinical thermometer, as shown in U.S. Pat. No. 4,317,367. Heretofore, fabrication of such wafer thermistors was not practical, as the electrical resistances of the thermistors had to be accurately rated following their fabrication, and this could only conveniently be done with relatively larger size thermistors.

Recently, techniques have been developed for fabricating thermistors of relatively small dimensions and which are quite thin in their thickness dimensions so that they are wafers. An inexpensive, rapid technique for accurately rating a small size wafer thermistor has also been developed, as shown in U.S. Pat. No. 4,200,970.

Wafer thermistors of quite small size, e.g. 0.060"×0.060"×0.010" are fabricated by initially forming a quite thin sheet of ceramic thermistor ware of considerably larger length and width dimensions, coating each of the opposite surfaces of the thermistor ware with a respective uniform, unbroken layer of electric contact material, e.g. a silver compound, as disclosed in U.S. Pat. No. 4,200,970, scoring the sheet for defining the individual thermistors to be broken from the sheet and also for defining a plurality, i.e. two, separate electric contacts on one surface of each thermistor and then breaking individual thermistors from the sheet.

The sheet is scored by an appropriate scoring means for forming a grid of score marks defining a plurality of small size rectangles. Each becomes a thermistor wafer. The scoring means further scores at least one surface of the sheet for removing some of the contact material on each thermistor wafer to define the plurality of contacts on that surface of each thermistor. As a matter of choice, the sheet may be scored for both the wafer forming score marks and the contact forming score marks on one surface of the ware, or the wafer forming score marks and the contact forming score marks may be scored on opposite surfaces. The wafer forming score marks are made deep enough so as to cut all the way through the layer of contact material on that surface and to cut partially through the thermistor material itself. Thereafter, when a bending moment of force is applied to the sheet in an attempt to bend it at one of the wafer forming score marks, the sheet snaps at that mark. In this manner, all of the wafers are eventually broken free from the sheet. The contact forming score marks in the contact material are not so deep as the wafer forming score marks, but are sufficiently deep to remove all of the contact material along that mark.

For defining all of the score marks in the sheet of thermistors, various known scoring means may be used. Conventional rubbing or abrading means may be used. It has been found, however, that for the small size thermistors being formed here, this is not the best technique. Another known technique is to blow an abrasive powder under pressure against the surface of the sheet of thermistors. Motion of the stream of powder across the sheet will form the score marks. Yet another known technique is to direct an appropriately intense laser beam at the surface of the sheet of thermistors and to move the beam over the surface for defining the score marks. The intensity of the laser beam and the speed at which it moves over the surface of the sheet determines the amount of material that is burned away and determines the depth and width of the score marks.

The bending moment of force applied to adjacent thermistors to break them apart is applied to the entire body of each thermistor then being separated. Since the contacts on the surface of the thermistor are also separated from each other by a score mark across the thermistor, the potential exists for the thermistor to break where it has been weakened along the score mark separating the contacts.

With thermistors having length and width dimensions that are fairly near to one another, there has not been a significant problem of breakage of the thermistor along the contact forming score mark. In a clinical thermometer of the type described in U.S. Pat. No. 4,317,367, the length and width dimensions of an individual thin thermistor wafer have been relatively similar. When force has been applied on the sheet of thermistors for separating adjacent thermistors, the sheet has reliably broken along a score mark separating the adjacent thermistors.

Wafer-type thermistors may be used in other applications besides a clinical thermometer. For instance, the thermistor may be inserted into a catheter, such as a catheter that may be inserted into a blood vessel. Since the catheter is quite narrow, the length and width dimensions of that thermistor may radically differ from those dimensions of a thermistor that can be used in a clinical thermometer. For a thermistor to have a particular resistance and a particular resistance change in response to a temperature change, the thermistor must have a sufficient mass of thermistor ceramic material. Yet, the thermistor that is used in a catheter, for example a catheter that is inserted into a blood vessel, must be relatively thin in two of its dimensions, its width and thickness dimensions, so that it can be fitted on or inside a catheter to be inserted in a blood vessel. To give the thermistor the needed mass, its length dimension is proportionately greatly increased. The thermistor is installed in the catheter with its length dimension extending along the length dimension of the catheter, so that the resulting catheter is thin in its thickness or diameter. That elongate thermistor still has a score mark through its contact material for defining two electric contacts on one surface of the thermistor. For convenience in electrically connecting the thermistor in the resistance measuring circuit (which is calibrated to measure temperature), the score mark in the contact material on one surface for defining the two contacts of the thermistor extends along the short, width dimension of the thermistor. Because the thermistor is quite long in its length dimension, there is a long lever arm between the contact forming score mark in the thermistor on the one hand, and the opposite, short length edges of the thermistor wafer that are spaced away from this score mark. When it is desired to separate the adjacent thermistors at those short length edges, and a bending moment of force is applied to attempt to snap the thermistor sheet at those wafer forming score marks at the short length edges, the moment of force applied to an individual thermistor may also be large enough that, on some occasions, an individual thermistor will itself snap apart and break at the contact forming score mark, which destroys the thermistor. This tendency is enhanced because the contact forming score mark has heretofore been a straight line, parallel to two of the edges of the thermistor, and the bending force applied to separate adjacent thermistors along those two edges also tends to snap the thermistor on the contact forming score mark.

SUMMARY OF THE INVENTION

Accordingly, it is the primary object of the present invention to prevent a wafer thermistor in a sheet of thermistors from breaking at its contact defining score mark when adjacent thermistors in the sheet are separated by bending the sheet of thermistors until it snaps and breaks apart at the wafer forming score mark between adjacent thermistors.

It is another object of the invention to prevent breakage of such a thermistor at the contact defining score mark even when the thermistor is quite long in one dimension and the score mark which defines the contacts of the thermistor extends across the short dimension of the thermistor.

It is a further object of the invention to shape the contacting defining score mark of a thermistor so that the thermistor does not have breaks in its contact material, caused by the contact forming score mark, which breaks are aligned at opposite edges of the thermistor.

According to the invention, the contact defining score mark in the contact material on one surface of the wafer thermistor is shaped in other than a straight line, i.e. in an unclosed geometric shape. The score mark extends between the opposite edge of the wafer. Measured along the length dimension of the wafer, the score mark is preferably at a different position along one edge of the wafer than the same score mark is along the other edge of the wafer. Therefore, an imaginary straight line across the wafer which intersects the contact defining score mark at one edge of the wafer will not intersect that score mark at the opposite edge. If the contact defining score mark were at the same location along the length dimension of the wafer thermistor at both wafer edges, this would make it easier for the thermistor to break along the line across the thermistor where the score mark intersects both edges. Hence, having the score mark intersect the opposite edges at different locations along the edges is preferred.

The contact defining score mark extends between the edges along the width dimension. That score mark can have any selected length dimension along the thermistor. The greater the length dimension of the contact separating score mark along the thermistor, the more resistant the thermistor will be against snapping and breaking apart along the contact defining score mark.

As a result of this shaping of the contact defining score mark, a bending moment of force applied to the sheet of thermistors to attempt to bend the same so that it will snap and break apart at the wafer defining score marks will not also be applied along a straight, easily broken contact defining score mark that extends across the middle of the thermistor. Because of the unclosed geometric shape of the contact defining score mark, at every line along the length of the thermistor where a bending moment is applied, there is unbroken contact material on the surface of the thermistor, which strengthens the thermistor at all lines along the thermistor against breaking.

In one form, the contact defining score mark is generally V-shaped, with the V being oriented so that its outer ends extend along the longer opposite edges of the thermistor and its apex projects in the length dimension of the thermistor. The V is preferably asymmetric, in that one leg is longer than the other, so that the ends of the legs intersect the respective long edges of the thermistor at different positions along the length of the thermistor. The legs of the V may each be unbent and intersect the respective edge of the thermistor at an oblique angle. Alternatively, the obliquely inclined legs of the V may terminate just short of intersecting the long edges of the wafer and be provided with short length tails which are turned outward toward and intersect the edges of the thermistor. Instead of being V-shaped, the contact defining score mark may be U-shaped, again with short, outwardly directed tails at the ends of the legs of the U intersecting the edges of the thermistor. Other open geometric shapes for the contact separating score mark may be envisioned. This contact defining score mark can be so shaped and placed on the surface of the thermistor wafer that the contacts they define either have the same volume of contact material or have any selected relationship in their volume of contact material.

The contact defining score mark has corners and apices at which it changes direction. Preferably, these are rounded. As a result, the contact defining score mark can be formed in one sweep of the score mark forming means, like a laser beam, across the wafer. The corners and apices may also be sharp, rather than rounded. To form such sharp corners and apices may require a plurality of sweeps of the mark forming means, with each sweep starting at each sharp change in direction of the mark.

Other objects and features of the present invention will become apparent from the following description of preferred embodiments of the invention taken in conjunction with the accompanying drawings.

BRIEF DESCRIPTION OF THE DRAWINGS

FIG. 1 is a plan view of a wafer thermistor with a contact defining score mark according to the prior art;

FIG. 2 is a plan view of a thermistor with such a score mark according to the present invention;

FIG. 3 is a perspective view of the thermistor of FIG. 2;

FIG. 4 is a plan view of a section of a sheet of thermistors according to the present invention prior to separation of the thermistors from the sheet;

FIG. 5 is a cross-sectional view of a fragment of the sheet along the line 5—5 in FIG. 4;

FIG. 6 is the same type of view as FIG. 5 of a second embodiment of the invention;

DETAILED DESCRIPTION OF THE PREFERRED EMBODIMENTS

Figure 7:
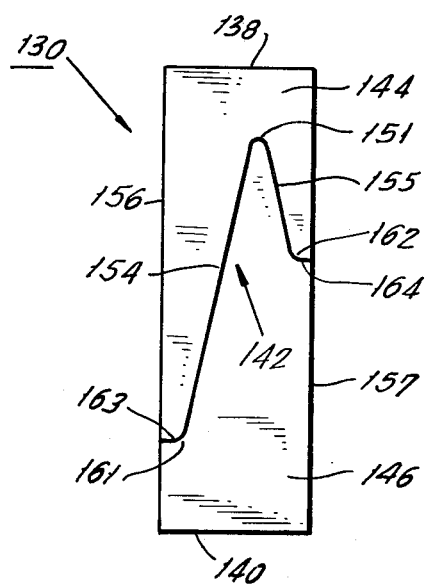
FIG. 7 is the same type of view of a third embodiment of the invention.

FIG. 1 shows a thermistor 10 according to the prior art. The thermistor is comprised of a flat wafer body of ceramic material with a negative coefficient of resistivity, such that the resistance of the thermistor decreases in a predictable manner as the temperature of the thermistor increases. The ceramic body is coated on opposite surfaces with respective layers of electric contact material 12, such as a composition including silver. One such surface is seen in FIG. 1. The thermistor 10 has an elongate length dimension between its end edges 14, 16, a shorter width dimension between its side edges 18 and 20 and a thickness dimension between the illustrated layer of contact material 12 and the opposite surface. The layer 12 of contact material is separated into two electric contacts by a straight score line 24 extending completely across the middle of the thermistor on its narrow width dimension. The score line 24 is narrow enough and deep enough that the contact material 12 is removed down at least to the surface of the ceramic material beneath. Two contacts 26 and 28 are thereby defined in the layer 12. As is apparent from FIG. 1, because the thermistor 10 is so much longer between its edges 14 and 16 than it is wide between its edges 18 and 20, the sections of thermistor carrying the contacts 26 and 28 are also considerably longer than they are wide.

When the thermistors 10 are initially fabricated, they are fabricated in a large area sheet, like the sheet of which a fragment is shown in FIG. 4. The contact material and part of the semiconductor thermistor material are scored by a grid of score marks or lines which define the edges of the individual wafer thermistors in the sheet of coated thermistor ware. The thermistor 10 is attached to adjacent thermistors at all of its peripheral edges 14, 16, 18, 20. To separate the thermistor 10 from the adjacent thermistors at its short length, widely separated edges 14 and 16, a bending moment of force is applied to the essentially inflexible sheet of thermistors to snap and break the sheet at the weakened score marks at edges 14 and 16. The bending moment is inherently also applied along the whole length of the thermistor and thus at the contact defining score line 24 between the edges 14 and 16. Because of the great length of the thermistor between its edges 14 and 16, the moment of force applied to the thermistor and at the score line 24 may be great enough to undesirably snap the thermistor 10 at the score line 24. It is to avoid the undesirable breakage of individual thermistors at their contact defining score marks that the present invention is directed.

The thermistor 30 according to the invention shown in FIGS. 2, 3 and 5, comprises the thin sheet layer of thermistor ceramic 32, the lower unbroken layer 34 of electric contact material and the upper layer 36 of electric contact material. The thermistor 30 is scored, intermediate its length between its longitudinal ends 38 and 40, with a score mark 42 which extends through the layer 36 of contact material and perhaps slightly into the adjacent surface of the layer 32 of ceramic material for separating the layer 36 into two separate electric contacts 44 and 46. The contact defining score mark 42 is not a straight line, like score mark 24 in FIG. 1, but is instead an asymmetric, generally V-shaped, unclosed geometric shape, with the V being upright in the length direction of the thermistor. The apex 51 of the V points toward one end and 38 of the thermistor, while the ends 52 and 53 of the legs 54, 55 of the V intersect the respective side edges 56 and 57 of the thermistor. The apex is rounded, not sharply pointed so that when the score mark 42 is formed by a laser scribing means, the laser beam can form the score mark 42 in a single sweep across the wafer. The apex 51 may be sharply pointed, if desired, without adversely affecting the performance of the contact defining score mark. The legs 54 and 55 are of unequal length, so that their ends 52 and 53 meet the edges 56 and 57 at different locations along the length of the thermistor between its ends 38 and 40. This can result from the respective angles of deflection of the legs 54 and 55 from the apex 51 and from the off center location of the apex 51, which is closer to the side edge 57 of the thermistor than to the side edge 56.

When a bending moment of force is applied to the thermistor 30 in a sheet of thermistors to separate the thermistor from the adjacent thermistors along its short edges 38 and 40, the contact defining score mark 42 is sufficiently transverse to the length dimension of the thermistor, changes its directions sufficiently and is of a sufficient height along the length dimension of the thermistor that the thermistor is strong enough along the V-shaped score mark to reliably avoid breaking there. The greater the height of the score mark 42, the more resistant the thermistor will be to breaking along that mark. The shape and placement of the score mark 42 can be selected so that the overall volumes of contact material of the contacts 44 and 46 will be in a desired relationship, e.g. the same amount of material will be included in each contact. Furthermore, the ends 52 and 53 of the legs are separated along the length dimension of the thermistor. Thus, where they intersect the edges 56 and 57, there is no break in the contact material at both side edges which is at the same location along the thermistor. This helps in preventing the thermistor from being weakened along any single line across the thermistor where the two ends 52 and 53 intersect the respective wafer edges. Other open geometric shapes for the contact defining score mark may be envisioned by one skilled in the art. Some are described below.

FIGS. 4 and 5 show why the invention is valuable. Individual thermistors 30 are provided in a sheet 60. The sheet 60 comprises a thin sheet of thermistor ceramic material or ware. The large area top and bottom surfaces of the sheet are coated with respective thin layers of electric contact material. Then at least the upper surface, visible in FIGS. 4 and 5, is provided with score marks, by a controlled laser beam (not shown), for example, which is moved over or with respect to the sheet for burning the score marks into the exposed surface of the sheet. A first group of score marks define the aforesaid contact defining score marks 42 on each of the thermistors 30. As can be seen in FIG. 5, these score marks 42 extend at least completely through the upper layer 36 of contact material. To be certain that they are at least that deep, the score marks 42 may just pierce into the adjacent surface of the ceramic layer 32.

A second group of score marks 62 is also defined in one surface of the sheet of thermistor ware. In FIGS. 4 and 5, these score marks are in the same surface as the score marks 42. The score marks 62 would normally be deeper than the score marks 42 for assuring that the sheet of thermistors will break along the score marks 62 when a bending moment of force is applied to the sheet. The score mark 62 shown in FIG. 5 extends completely through the layer 36 of electric contact material and pierces a distance into the layer 32 of ceramic thermistor ware. Each score mark 62 defines the end 40 of one thermistor 30 and the end 38 of the next adjacent thermistor 30, when the thermistor sheet is broken at the score mark 62. In FIG. 4, the score marks 62 extend horizontally. There are similar, equally deep score marks 64 extending vertically, transverse to the score marks 62. Each thermistor 30 is broken away from the adjacent thermistors 30 by applying a moment of force to bend the thermistor sheet to attempt to cause the edges 38 and 40 of adjacent thermistors in FIG. 5 to move apart. The thermistor sheet will snap and break apart along the deeper score marks 62 and 64 without, of course, breaking the individual thermistors 30 at their score marks 42.

The score marks 42 and 62 in FIGS. 4 and 5 are defined at the surface of the sheet of thermistors 30 carrying the contact layer 36. No score marks are defined in the opposite surface of the sheet of thermistors carrying the contact layer 34. However, additional score marks aligned with the score marks 42 and/or 62 may be provided at the sheet surface carrying the layer 34. But, corresponding score marks at both surfaces of the thermistor sheet should be aligned.

FIG. 6 illustrates a fragment of a sheet of thermistors which would have the appearance of the sheet in FIGS. 4 and 5, except that the thermistor defining score marks 66 extend through the conductive layer 36 and pierce into the ceramic thermistor material from the opposite side than the contact defining score marks 42. The bending moment of force for separating an individual thermistor from this sheet would be applied against the sheet from the opposite direction from which it would be applied with the embodiment of FIG. 5. The resulting thermistor 30 would have the same appearance when it is separated from the sheet.

FIG. 7 shows another embodiemnt of thermistor adapted with the invention. This embodiment corresponds generally to the embodiment of FIG. 2, and the elements thereof are correspondingly numbered with reference numerals raised by 100. Only the distinctive features will be discussed. The legs 154 and 155 of the generally V-shaped contact defining score mark 142 terminate at ends 161, 162 which are spaced in from the side edges 156, 157 of the thermistor. From the ends 161, 162, the respective tail portions 163 and 164 extend out to the respective edges 156, 157 of the thermistor. Thus, the edges of the thermistor are intersected by score marks transverse thereto, rather than score marks intersecting those edges at an angle. Other characteristics of the thermistor 130 of FIG. 6 correspond to those of thermistor 30 of FIG. 2. The ends 161, 162 between the legs 154, 155 and the tail portions 163, 164 are also rounded like the apex 151 to permit the mark 142 to be formed in a single sweep.

Figure 8:
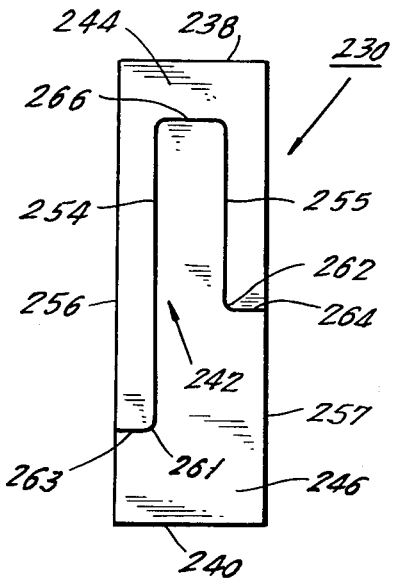
FIG. 8 is the same type of view of a fourth embodiment of the invention.

The thermistor 230 of FIG. 8 also shares characteristics in common with the thermistors 30 and 130. Again, corresponding reference numerals, raised by 200, are used to refer to the same elements of the thermistor, and only the features distinctive to this embodiment are further discussed. The contact defining score mark 242 is generally U-shaped, instead of V-shaped, and has a generally flattened base 266, instead of the apex of a V. The legs 254 and 255 extend along the thermistor parallel to the edges 256, 257, rather than at an angle to them. The legs 254 and 255 terminate at their ends 261, 262 and the tails 263 and 264 then extend out to the lateral edges 256 and 257 of the thermistor. Again, all of the corners between the base 266, legs 254, 254a and tails 263, 264 are rounded, but may alternatively be sharp corners.

Figure 9:
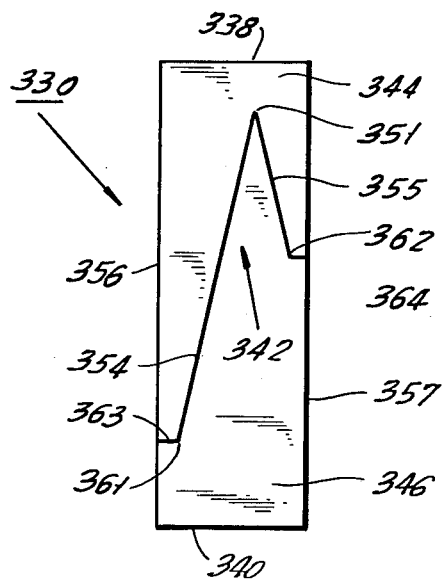
FIG. 9 is the same type of view of the fifth embodiment.

The final embodiment of FIG. 9 corresponds to that of FIG. 7 with reference numerals corresponding to those in FIG. 7, but raised by 200 from the numbers in FIG. 7. This embodiment differs from FIG. 7 in that the various meeting points between lines, at apex 351 and leg ends 361 and 362 are sharp corners, instead of being rounded. Especially where a laser is involved, forming sharp corners may require interruption of the operation of the laser in order to start a new line. If these corners are, in contrast, rounded, then the laser can trace a continuous path along the entire length of a contact defining score mark, without having to interrupt its travel over the thermistor, which will speed laser operation.

In all of the embodiments, there are no score marks which cut into the contact material on the surface of the thermistor at both side edges at the same location along the thermistor, and this helps avoid breakage of the thermistor. Furthermore, in all of the embodiments, in any line across the thermistor between its long edges, when a bending moment is applied to the thermistor to break it away from an adjacent thermistor along the edges 38 and 40, there is no straight weakened line extending across the entire width of the thermistor, which would easily break. Across the entire width dimension of the thermistor at any location along the length of the thermistor, there is some unbroken contact material which resists breakage of the thermistor along the contact defining score mark.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A thermistor, or the like electric component, comprising a wafer-like piece of ceramic thermistor ware, or the like, having two large area opposite surfaces, the piece of thermistor ware having two spaced apart opposite edges; a layer of electric contact material covering at least one of the surfaces of the piece; and a contact defining score mark extending completely through the layer of contact material and completely across the piece between its opposite edges for defining two separate contacts from the layer of contact material on the piece; the contact defining score mark having an open geometric shape other than a straight line extending between the edges of the piece.

2. The thermistor, or the like electric component, of claim 1, wherein there is also a layer of contact material covering the opposite surface of the electric component.

3. The thermistor, or the like electric component, of claim 1, wherein the piece of thermistor ware has second edges wich intersect the first mentioned opposite edges; the contact defining score mark intersects the two opposite edges at different locations along the length of the opposite edges, whereby a line across the piece of thermistor ware from the point of intersection of the contact defining score mark with each opposite edge of the piece of thermistor ware will not also intersect the intersection between the contact defining score mark and the other opposite edge of the piece of thermistor ware.

4. The thermistor, or the like electric component, of claim 1, wherein the piece of thermistor ware has second edges which intersect the first mentioned opposite edges; the contact defining score mark having two legs extending in a direction toward one of the second edges and the legs being joined at a joining section of the contact defining score mark.

5. The thermistor, or the like electric component, of claim 4, wherein the contacting defining score mark is generally V-shaped, with the two legs thereof intersecting, and the apex of the V extending in a direction across the direction between the first edges of the piece.

6. The thermistor, or the like electric component, of claim 5, wherein the legs of the V terminate at respective free ends which are spaced inward from the first edges; a respective tail extends from the free end of each leg at an angle to that leg and intersects the respective adjacent first edge.

7. The thermistor, or the like electric component, of claim 6, wherein the intersections between the legs and between the legs and the tails are rounded.

8. The thermistor, or the like electric component, of claim 5, wherein the contact defining score mark is generally U-shaped, including two legs of the U and a web of the U joining the legs thereof, the legs extending in a direction across the direction between the first edges of the piece.

9. The thermistor, or the like electric component, of claim 8, wherein the intersections between the legs and the web of the U and between the legs and the tails are rounded.

10. The thermistor, or the like electric component, of claim 1, wherein the unclosed geometric shape extends in various directions across the respective surface of the piece and has intersections along the shape where it changes directions; the intersections being rounded.

11. The thermistor, or the like electric component, of claim 1, wherein the one surface of the piece is rectangular in shape.

12. The thermistor, or the like electric component, of claim 11, wherein the piece of thermistor ware has second edges which intersect the first mentioned opposite edges; the piece is much longer in the dimension between the second edges than it is between the first opposite edges of the piece.

13. The thermistor or the like component of claim 1, wherein the piece of thermistor ware has second edges which intersect the first mentioned opposite edges; the piece is much longer in the dimension transverse to the distance between the opposite edges of the piece than it is between the opposite edges of the piece.

14. A sheet of a plurality of thermistors, or the like electric components, the sheet comprising a relatively large area, thin in thickness sheet of ceramic ware, or the like, for forming a plurality of thermistors, or the like electric components; the sheet having large area opposite surfaces; at least one of the surfaces of the sheet being covered with a layer of electric contact material from which electric contacts may be defined on the thermistors formed from the sheet;

a first plurality of score marks into at least one surface of the sheet, extending a distance across that surface of the sheet, and being deep enough into the sheet so as to weaken the sheet along the first plurality of score marks so that the sheet may be broken along the first score marks by application of a bending moment to the sheet at opposite sides of each of the first score marks; the first score marks being placed to define peripheral edges of individual discrete sections of the sheet so that upon the sheet being broken along the first score marks, a plurality of individual thermistors, or the like electrical components, may be formed, each from an individual section of the sheet; each section having a pair of opposite edges;

a second plurality of score marks extending through the layer of electric contact material on one of the surfaces of the sheet and extending across each section of the sheet bordered by the first score marks; each second score mark being of a depth sufficient to completely remove the contact material along the second score mark; each second score mark on each section of the sheet having an unclosed geometric shape other than a straight line extending between the opposite edges of the respective section.

15. The sheet of claim 9, wherein the first score marks are applied to the sheet to define a grid of intersecting first score marks.

16. The sheet of claim 15, wherein the first score marks are in the form of a grid of intersecting lines oriented so that the individual sections of the sheet for forming thermistors are rectangularly shaped.

17. The sheet of claim 16, wherein the lines of the grid are placed so that each section is much longer in the length than in the width dimension; the opposite edges defining the width dimension; the second score mark on each section extends along its width dimension.

18. The sheet of claim 17, wherein the second score marks are generally V-shaped, with the apex of the V extending along the length dimension of the respective section and the V having ends which intersect the opposite edges of the section that define the width dimension.

19. The sheet of claim 17, wherein the unclosed geometric shape extends in various directions across the respective surface of the piece and has intersections along the shape where it changes directions; the intersections being rounded.

20. The sheet of claim 15, wherein each section of the sheet has second edges which intersect the first mentioned opposite edges; the second score mark having two legs extending in a direction toward one of the second edges and the legs being joined at a joining section of the second score mark.

21. The sheet of claim 15, wherein each section of the sheet has second edges which intersect the first mentioned opposite edges; the second score mark intersects the two opposite edges at different locations along the length of the opposite edges, whereby a line across the section from the point of intersection of the second score mark with each opposite edge of the section will not also intersect the intersection between the second score mark and the other opposite edge of the section.

22. The sheet of claim 14, wherein the first score marks pierce deeper into their respective surface of the sheet than the second score marks.

23. The sheet of claim 14, wherein the first and second score marks are in the same surface of the sheet.

24. The sheet of claim 14, wherein the first score marks are in one surface of the sheet and the second score marks are in the opposite surface of the sheet.

25. A method of forming a wafer-like thermistor, or the like electrical component, comprising:

forming a thin sheet of ceramic ware for thermistors, or the like electric components, and the sheet having large area opposite surfaces; covering at least one surface with a relatively thin layer of electric contact material;

forming a first plurality of score marks into and across one of the surfaces of the sheet and placing the first score marks so that they surround and define a plurality of sections of the sheet, wherein each section may comprise one thermistor, or the like electrical component;

forming a second plurality of score marks through the contact material coated on the surface of the sheet, and extending across the sheet and placing the second score marks so as to divide the contact material on the surface of the sheet in each of the sections thereof for defining electrically and mechanically separate portions of the contact material in the respective section, and the second score mark in each section extending across the section between two edges thereof and having an unclosed geometric shape other than a straight line;

whereby a bending moment of force applied to the sheet for causing the sheet to break along one of the first score marks will not cause the sheet to break along a second score mark in a section to which the bending moment is applied.

26. The method of claim 25, further comprising applying bending moments of force to the sheet for attempting to bend the sheet at the first score marks, for causing the sheet to snap and break apart at the first score marks.

27. The method of claim 25, wherein the first score marks are defined in a grid of intersecting lines which define the sections of the sheet in rectangular shape.

28. The method of claim 25, wherein the first score marks are made deeper into their respective surface of the sheet than the second score marks are made into their respective surface of the sheet.

29. The method of claim 25, wherein the first and second score marks are formed by moving a laser beam relative to the surface of the sheet being scored.

* * * * *